United States Patent [19]
Gallagher
[11] Patent Number: 4,501,128
[45] Date of Patent: Feb. 26, 1985

[54] HEAT RECLAMATION

[76] Inventor: Paul H. Gallagher, 2530 Crawford Ave., Evanston, Ill. 60201

[21] Appl. No.: 374,936

[22] Filed: May 5, 1982

[51] Int. Cl.[3] .......... F28D 7/08
[52] U.S. Cl. .......... 62/238.6; 62/263; 62/506; 165/56; 165/138; 165/170
[58] Field of Search .......... 165/138, 47, 53, 56; 62/238.1, 506, 513, 263, 238.6; 165/80 R, 80 E, 170

[56] References Cited

U.S. PATENT DOCUMENTS 2,156,184 4/1939 Koski .......... 62/238.1
2,645,100 7/1953 Bascom .......... 62/263
4,007,874 2/1977 Laudner .......... 62/238.1
4,206,804 6/1980 Schottes et al. .......... 165/76

FOREIGN PATENT DOCUMENTS 3012273 10/1981 Fed. Rep. of Germany .......... 165/47
436193 10/1935 United Kingdom .......... 165/47

*Primary Examiner*—Sheldon J. Richter
*Attorney, Agent, or Firm*—Paul H. Gallagher

[57] ABSTRACT

In a hot water system, a receptor heat exchanger unit mounted in a wall with a flat surface exposed in a room. A refrigerator positioned in that room has a plate with a condenser coil thereon. The plate is exposed, and it extends outwardly beyond the wall of the refrigerator body and at the wall, and the plate is positioned in heat transfer engagement with the exposed surface on the receptor heat exchanger unit.

9 Claims, 7 Drawing Figures

HEAT RECLAMATION

OBJECTS OF THE INVENTION

A broad object of the invention is to provide apparatus and method for transferring the heat dissipated from a heat generating appliance, such as a refrigerator, to a hot water heating system.

Another object is to provide such apparatus and method wherein the appliance is detached and disconnected from the hot water system, and is put in operative position by merely positioning it in contact engagement with the hot water system.

A further object is to provide such apparatus wherein both components, the hot water system and the appliance, appear without special modification made for the purpose.

An additional object is to provide such apparatus that can easily and inexpensively be retrofitted in a house.

DESCRIPTION OF A PREFERRED EMBODIMENT

Figure 1:
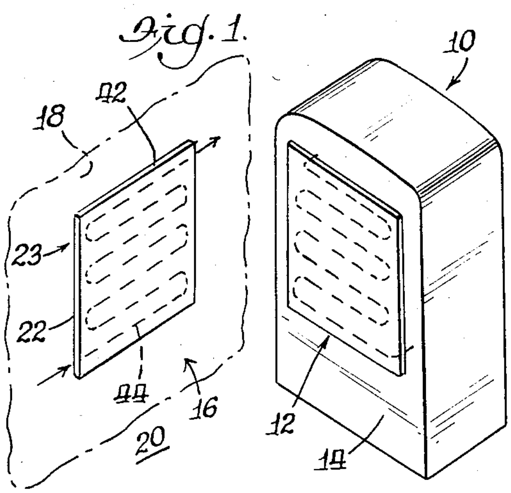
FIG. 1 is a perspective view, semi-diagrammatic in nature, of the principal components of the invention.
Figure 2:
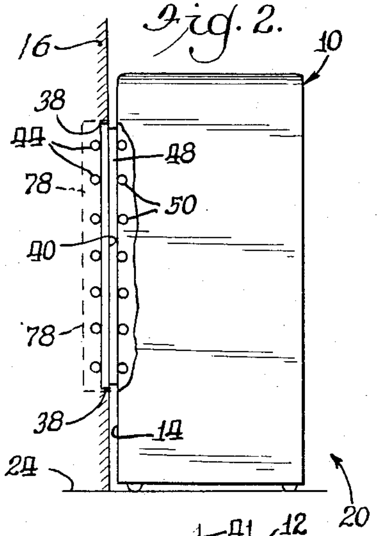
FIG. 2 is a side view of the components of FIG. 1 moved together to operative position.

Referring in detail to the drawings, FIG. 1 includes an appliance 10 which in the present case is a household refrigerator, which includes a donor heat exchanger unit 12 which is mounted on the rear side surface 14 of the refrigerator. FIG. 1 also shows a wall or wall structure 16 having an inner surface 18 forming one bounding side or limit of a space or room 20 in which the refrigerator 10 is located. Mounted in the wall structure 16 is a receptor heat exchanger unit 22 which is incorporated in a hot water system 23 as referred to again hereinbelow. The receptor heat exchanger unit 22 is exposed through the wall surface 18, or effectively so, and the refrigerator 10 when in operative heat exchange position, is moved up against the wall as represented in FIG. 2, with the unit 12 in contact engagement with the unit 2. FIG. 2 shows the wall 16 rising from a floor 24 on which the refrigerator rests.

Figure 3:
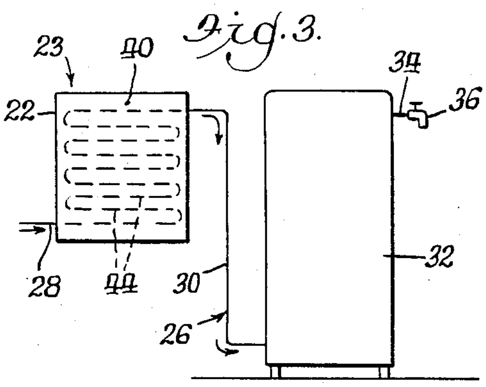
FIG. 3 is a view of a hot water system including one of the components of the present invention.

FIG. 3 diagrammatically shows a hot water system 23, referred to above, and includes a water line 26, itself including a cold water inlet line section 28 leading to the unit 22, a line section 30 leading to a water heater 32 of known kind, an outlet line section 34 leading from the heater, to an outlet faucet 36.

Figure 4:
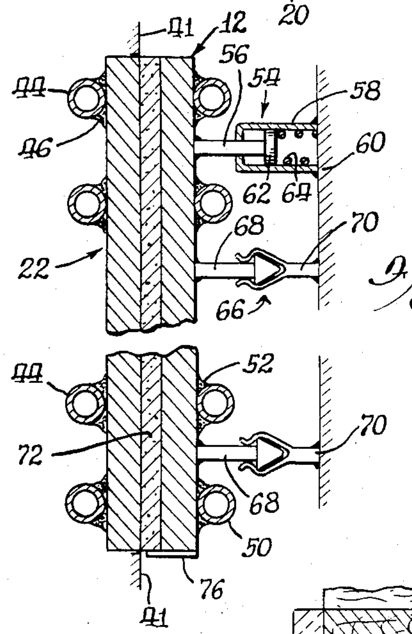
FIG. 4 is a large scale vertical sectional view of components of the apparatus, oriented according to FIG. 2.

As represented in FIGS. 1 and 2, the receptor heat exchanger unit 22 is mounted in the wall 16, in any suitable manner, in an aperture 38 therein, with the front surface 40 thereof substantially flush with the inner surface 18 of the wall. A wall covering 41 (FIGS. 4 and 7) may be applied to the wall surface 18, and if desired it may be extended over the surface 40 of the plate 22 so that if and when the refrigerator is moved away from the wall, the wall will appear uniform and as any other wall. The wall covering may be paper for example, or paint, and whatever medium is used, it is understood of course that it be of high heat conductivity.

The receptor heat exchanger unit 22 may include, in its simplest form, a flat plate 42 on which is mounted a coil 44 connected between the line sections 28, 30. The coil 44 is secured in any suitable fashion such as by soldering or welding it to the plate as indicated at 46. As will be understood the plate 42 is of heat high conductivity and may be steel, aluminum, etc. The physical structure of the plate and the coil thereon may be of known kind, and the number of increments of the coil may be as great as desired for maximum heat transfer, within practical limits.

The donor heat exchanger unit 12 may be structurally similar to the unit 22, including a flat plate 48 of high heat conductivity, such as of steel of aluminum, on which is mounted a coil 50 in good heat contact relation to the plate, being secured for example by soldering or welding indicated at 52. The coil 50 constitutes the condenser coil in a refrigerating system of known kind, the system including, of course, in addition thereto, an evaporator coil, compressor and motor. The coil 50 may be of any number of increments as desired, within practical limits.

The unit 12 is mounted in the refrigerator for adjusting movements, and particularly to effect its full contact engagement with the plate 42 of the unit 22. The plate 48 is mounted by means of a plurality of, preferably three, mounting means 54, each of which includes a shank or rod 56 fixedly secured to the plate and fitted in the sleeve 58 fixedly mounted at 60 on the frame of the refrigerator. The shank 56 is provided with a head 62, and a compression spring 64 is interposed between the head and the bottom of the sleeve. These springs bias the plate 48 outwardly, that is, rearwardly, from the rear surface 14 of the refrigerator.

Means is also provided for releasably holding the unit 12 in an inner position. For this purpose two or more jacks 66 are provided, each having a pin 68 secured to the plate 48, and a spring gripper 70 fixedly mounted on the refrigerator frame, the latter releasably gripping the pin.

In the operative heat exchange position of the refrigerator, represented in FIG. 2, it is desired that the unit 12 extend rearwardly from the rear surface of the refrigerator, as noted above, and in this case it is released from the jacks 66 and the compression springs 64 move it to its outer position, where it extends beyond the rear surface 14 of the refrigerator and free to fully engage the plate 42 of the unit 22.

Figure 5:
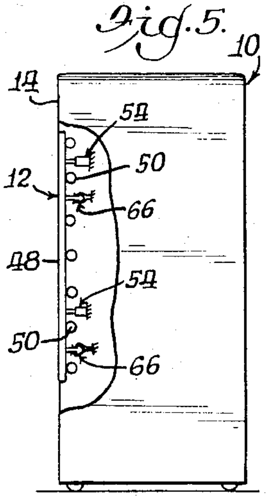
FIG. 5 is a semi-diagrammatic view of the appliance component of the invention, with the donor heat exchanger unit moved to an inner position.

It may be desired to use the refrigerator at a different location, and not in connection with the hot water system, and in that case the unit 12 would be moved to its inner position. This is done by merely pushing it inwardly so that the jacks 66 hold the plate in that position. In this position, represented in FIG. 5, the outer surface of the plate 48 is flush with the rear surface 14 of the refrigerator, and rising convection currents flow freely over the plate, producing heat transfer from the plate. This conconstruction is compared with presently known condensers where such rising convection currents flow through and around the elements of the coil. In the present case, great efficiency is accomplished because of the great surface area of the plate from which the heat is conducted, and easily and quickly carried off by the convection currents.

The plates 42, 48 of the heat exchanger units, may be accurately finished to a flat condition so that they effectively interengage throughout their areas. However, in order to provide greater assurance of such effective contact, a sheet 72 may be interposed between the plates, of high heat conductivity, but having a limited degree of resilience to compensate for any unevenness in the plates and effect full and perfect contact engagement between the elements. If desired a cleat 76 may be provided at the bottom of the plate 48 to form a ledge for temporarily holding the sheet 72 while the refrigerator is being moved into position.

It will be understood that suitable insulation is utilized in the hot water system including of course over the inner side of the receptor heat exchanger unit 22, as indicated at 78.

The apparatus thus far disclosed and described includes merely a preheating action on the water in the hot water system as it flows through the coil 44. It is also contemplated that the receptor heat exchanger unit may take the form of an actual tank having substantial capacity. Such a tank is indicated at 80 in FIGS. 6 and 7. This tank includes a shell or casing 82 and horizontal vanes 84 therein successively secured at opposite sides with their other ends removed from the adjacent wall to provide full flow of water as indicated by the arrows 86. In this case the water lines 28, 30 are also shown.

Figure 6:
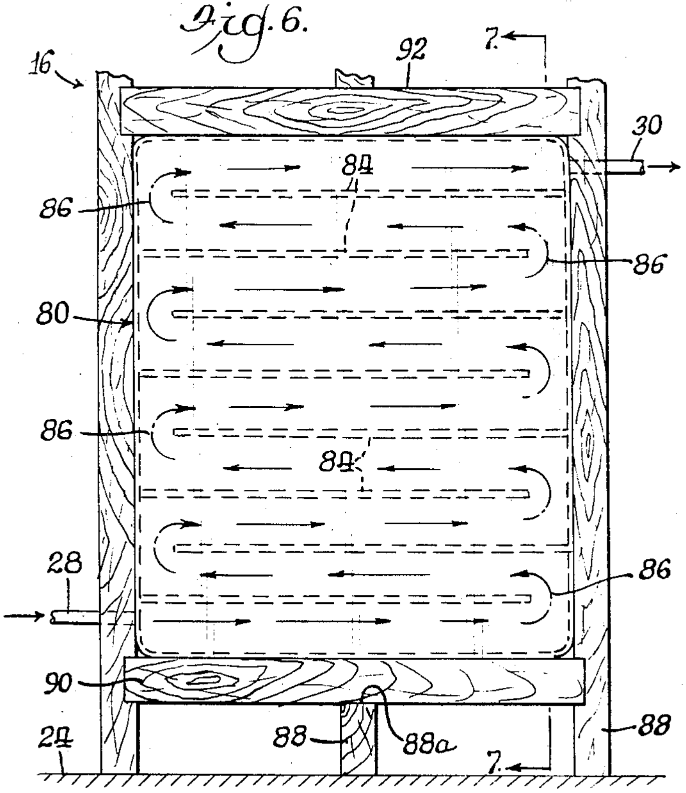
FIG. 6 is a face view of a receptor heat exchanger unit mounted in a wall construction.
Figure 7:
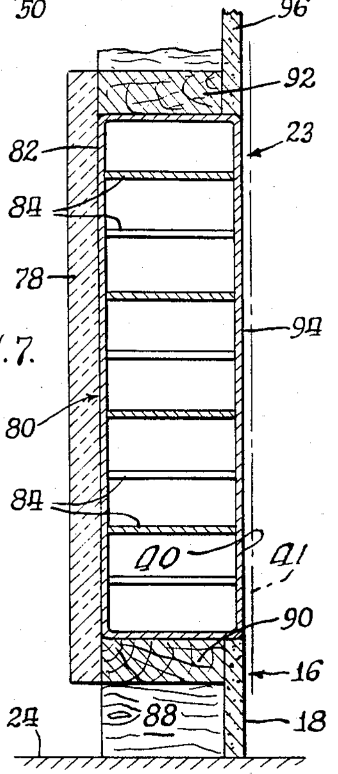
FIG. 7 is a sectional view taken at line 7—7 of FIG. 6.

As noted above, a principal object of the invention is the facility with which the unit 22, in this case the tank 80, can be mounted in an existing structure. This is particularly advantageous in the case of a home, and in most homes the wall structure includes studs, and those usually of wood, and most often two by fours. In FIGS. 6 and 7 the same wall structure 16 identified above is shown and it includes studs 88. A cross piece 90 is utilized for supporting the tank, and according to the desired dimensions of the tank to be accommodated, one or more studs 88 may be partially cut out as indicated at 88*a* to provide a wider tank space. The upper cross piece 92 may be interposed to complete the structure.

FIG. 7 shows the position of the tank 80 relative to the inner surface 18 of the wall structure where it is seen that the inner surface 94 of the tank is substantially flush with that wall surface. In the present case there is also another element of the wall structure, namely an inner surfacing element 96 which may be for example plaster, dry wall element, etc., and the inner surface of the tank is made flush with that surfacing element. A wall covering is indicated at 41, as referred to above, and it will be seen that heat insulation material 78, referred to above, is applied to the inner side of the tank.

The apparatus adapts itself very readily to great preheating capacity in a hot water system, particularly that of a home. A very common size of hot water heater 32 (Fig. 3) is 35 gallon capacity, and the tank 80 can be provided with a great capacity relative to that capacity, adding in overall effect to the heating facility, but particularly readily absorbing the heat generated from the refrigertor, in an efficient manner. Assuming the studs and related elements in the wall structure are two by fours, or comparable dimension in the four-inch direction, and including the inner wall element 96 (FIG. 7) which may be for example in the neighborhood of one-half inch thick, there is dimension accessible to the tank 80, in thickness direction, of in the neighborhood of four inches. Again assuming thickness of the bounding elements of the tank, an interior thickness direction of three and three-quarter inches is found practicable. Further in an ordinary home construction, the studs 88 are usually on 16-inch centers, and by omitting one such stud (FIG. 6) a space of in the neighborhood of thirty inches wide is provided between the next two outer studs. Then a tank in the neighborhood of five and one-half to six feet tall, of the thickness and width mentioned, would provide a capacity of in the neighborhood of thirty to thirty-five gallons. This capacity, particularly considered as a preheating capacity relative to the usual hot water heater 32, provides an extremely high efficiency in capturing and utilizing the heat from the refrigerator.

Utilization of this heat from the refrigerator is probably most appreciated in the summertime when such heat is not utilized in home heating functions, and diverting this heat to the hot water system is a corresponding advantage. Even in the wintertime, when the heat from the refrigerator may be utilized in house heating functions, and thereby not considered wasted heat, the apparatus enables the control of that heat so that it would not be concentrated in one locality, namely the immediate vicinity of the refrigerator, with an added advantage that it greatly eliminates rising air currents, because of the immediate cooling effect of the unit 12, and does not mar or disfigure walls in the room in which the refrigerator is located.

Another great advantage of the apparatus is that it can be retrofitted in a home or structure with a minimum of alteration, such as by merely mounting the receptor heat exchanger unit in a wall, and the appliance is equally as effective whether applied to the hot water system or standing alone.

I claim:

1. Heat reclamation apparatus incorporating, (a) a water system including a cold water inlet and hot water outlet, and (b) a movable refrigerator separate from and operable independently of the water system, and generating heat as a necessary function of its operation, wherein, the water system includes a receptor heat exchanger unit through which the water flows, and which has a first exposed surface, the refrigerator includes a donor heat exchanger unit having a second exposed surface receiving the heat generated by the refrigerator, and the refrigerator is movable into and out of a position in which its said second exposed surface is in heat transfer engagement with said first exposed surface, and those exposed surfaces are also detached and separate items without interconnection except loose contact engagement.

2. Apparatus according to claim 1 wherein, said exposed surfaces are formed by plates having flat surfaces interengaging throughout substantial areas.

3. Apparatus according to claim 2 and wherein, the plates are of metal and therefore rigid, and the apparatus includes a sheet of high heat conductivity and limited resilience interposed between the plates and operably engaging them.

4. Apparatus according to claim 2 wherein, the receptor head exchanger unit includes heat exchanger elements distributed generally throughout the extent of its said first exposed surface, and the heat exchanger unit has a capacity for holding water of a substantial portion of the capacity of the water heater.

5. Apparatus according to claim 2 in conjunction with a wall structure having a surface forming a boundary of a space, and the appliance is adapted to be placed in that space, and wherein, the receptor heat exchanger unit is mounted in the wall structure with said first exposed surface thereof lying substantially flush in said wall surface, and the donor heat exchanger unit is so positioned in the appliance that the second exposed surface of that unit is adjacent an exterior surface of the appliance, and the appliance is so positionable in said space, adjacent the wall, that the donor heat exchanger unit engages the receptor heat exchanger unit.

6. Apparatus and wall structure according to claim 5 and including, a continuous wall covering, of high heat conductivity, on the surfaces of the wall structure and receptor heat exchanger unit to provide a continuous wall appearance.

7. Apparatus according to claim 5 and including, means for adjustably positioning the donor heat exchanger unit in an inner position in which said second exposed surface thereof is adjacent the plane of the corresponding bounding surface of the appliance, and in positions outwardly of that bounding surface, selectively.

8. Apparatus according to claim 7 and including, means for yieldingly biasing the donor heat exchanger unit outwardly, and means for releasably but stably securing the donor heat exchanger unit in its said inner position.

9. Apparatus according to claim 5 wherein, the wall structure is of substantial thickness and the receptor heat exchanger unit is relatively thin and flat and dimensioned so as to be contained substantially within the thickness dimension of the wall structure.

* * * * *